(12) United States Patent
Sensui

(10) Patent No.: US 6,317,271 B1
(45) Date of Patent: Nov. 13, 2001

(54) ZOOM LENS SYSTEM

(75) Inventor: Takayuki Sensui, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/504,081

(22) Filed: Feb. 15, 2000

(30) Foreign Application Priority Data

Feb. 18, 1999 (JP) .................................................. 11-039988

(51) Int. Cl.$^7$ .................................................. G02B 15/14
(52) U.S. Cl. .......................................... 359/686; 359/680
(58) Field of Search ........................... 359/686, 680–682, 359/683, 676

(56) References Cited

U.S. PATENT DOCUMENTS

| | | | |
|---|---|---|---|
| 4,516,839 | 5/1985 | Tokumaru | 359/686 |
| 6,075,653 | * 6/2000 | Narimatsu et al. | 359/686 |

FOREIGN PATENT DOCUMENTS

| | | |
|---|---|---|
| 2080966 | 2/1982 | (GB) . |
| 54151027 | 11/1979 | (JP) . |
| 55-14403 | 4/1980 | (JP) . |

* cited by examiner

Primary Examiner—Jordan M. Schwartz
(74) Attorney, Agent, or Firm—Greenblum & Bernstein P.L.C.

(57) ABSTRACT

A zoom lens system according to the present invention includes a negative first lens group, a positive second lens group, a negative third lens group and a positive fourth lens group, in this order from the object. The zoom lens system satisfies the following conditions:

$$4 < fL/D1 < 6 \qquad (1)$$

$$1.0 < |fL/f1| < 1.3 \qquad (2)$$

wherein
  fL designates the focal length of the entire zoom lens system at the long focal length extremity;
  D1 designates the distance, along the optical axis, from the most object-side to the most image-side lens surfaces of the first lens group; and
  f1 designates the focal length of the first lens group.

4 Claims, 20 Drawing Sheets

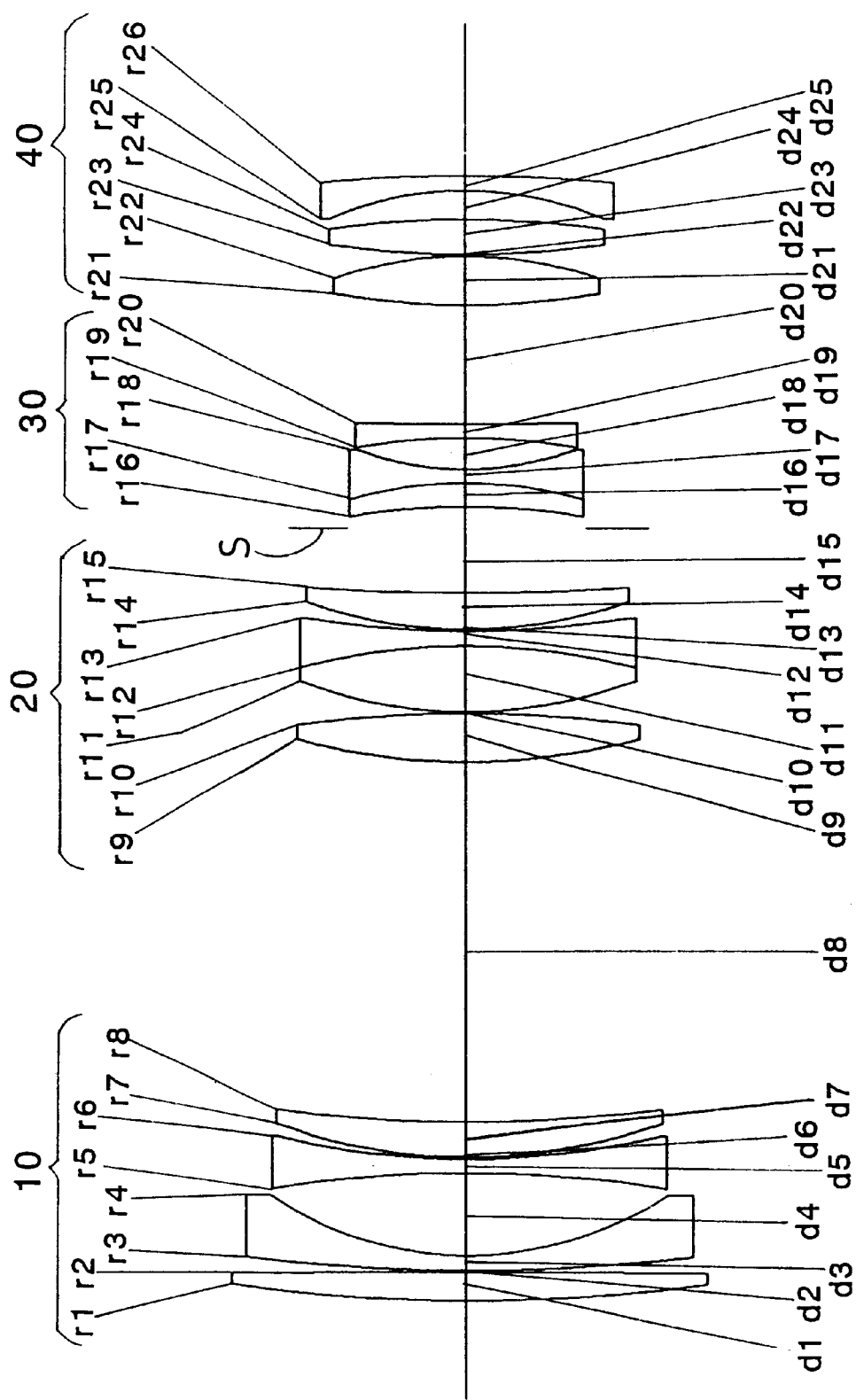

F_NO=2.8

-0.2   0.2

SPHERICAL
ABERRATION

CHROMATIC
ABERRATION

W=13.6°

-0.02  0.02

LATERAL
CHROMATIC
ABERRATION

W=13.6°

-0.2   0.2

ASTIGMATISM

W=13.6°

-5  (%)  5

DISTORTION

— d Line
---- g Line
--- C Line

— S
-- M

Fig. 7
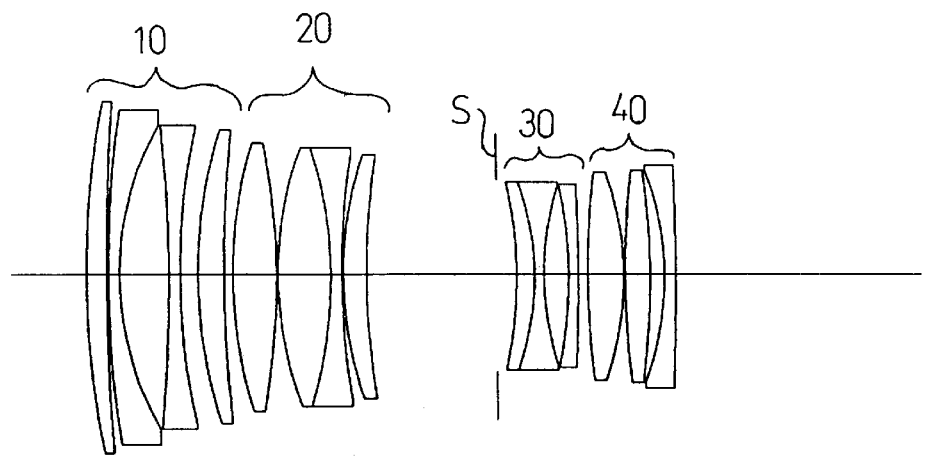
Fig.8A
$F_{NO}=2.8$
Fig.8B
$W=13.6°$
Fig.8C
$W=13.6°$
Fig.8D
$W=13.6°$
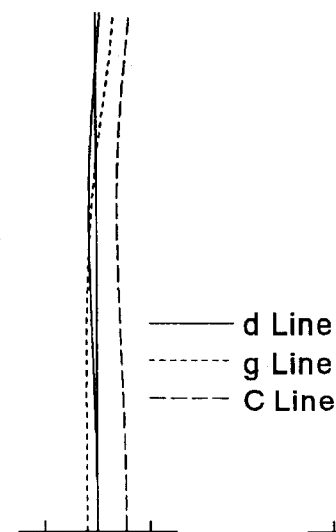
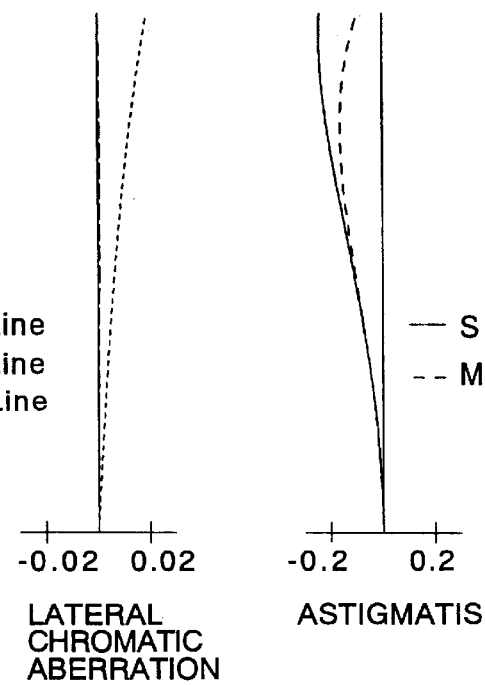
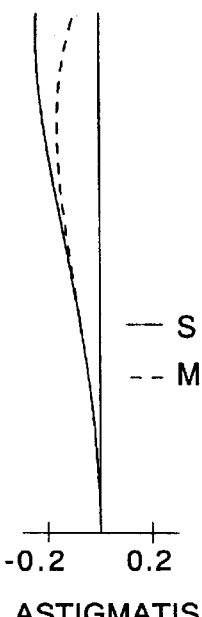
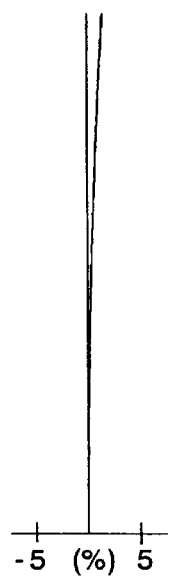
—— d Line
----- g Line
– – – C Line
—— S
– – M
-0.2  0.2
SPHERICAL
ABERRATION
CHROMATIC
ABERRATION
-0.02  0.02
LATERAL
CHROMATIC
ABERRATION
-0.2  0.2
ASTIGMATISM
-5 (%) 5
DISTORTION

F_{NO}=2.8  W=25.9°  W=25.9°  W=25.9°

SPHERICAL ABERRATION
CHROMATIC ABERRATION

LATERAL CHROMATIC ABERRATION

ASTIGMATISM

DISTORTION $F_{NO}=2.8$

-0.2　0.2

SPHERICAL
ABERRATION

CHROMATIC
ABERRATION

W=13.6°

-0.02　0.02

LATERAL
CHROMATIC
ABERRATION

——— d Line
------- g Line
- - - C Line

W=13.6°

-0.2　0.2

ASTIGMATISM

——— S
- - - M

W=13.6°

-5　(%)　5

DISTORTION $F_{NO}=2.8$

—— d Line
······ g Line
– – – C Line

-0.2  0.2

SPHERICAL
ABERRATION

CHROMATIC
ABERRATION $W=25.9°$

-0.02  0.02

LATERAL
CHROMATIC
ABERRATION $W=25.9°$

—— S
– – M

-0.2  0.2

ASTIGMATISM $W=25.9°$

-5 (%) 5

DISTORTION $F_{NO}=2.8$

W=13.6°

W=13.6°

W=13.6°

— d Line
----- g Line
---- C Line

— S
-- M

-0.2   0.2
SPHERICAL ABERRATION
CHROMATIC ABERRATION

-0.02   0.02
LATERAL CHROMATIC ABERRATION

-0.2   0.2
ASTIGMATISM

-5 (%) 5
DISTORTION

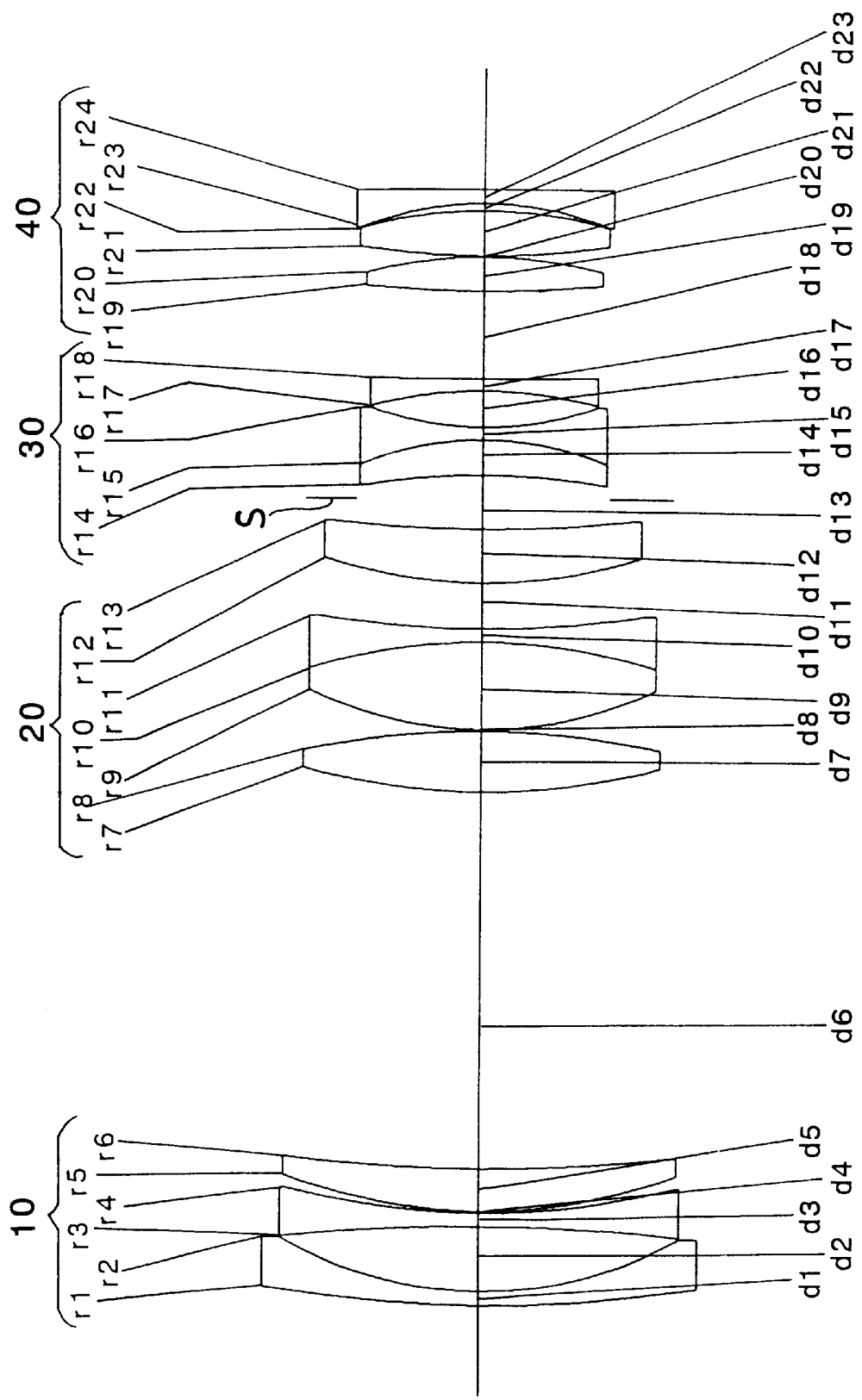

F_NO=2.4

SPHERICAL ABERRATION
CHROMATIC ABERRATION

W=26.5°

LATERAL CHROMATIC ABERRATION

W=26.5°

ASTIGMATISM

W=26.5°

DISTORTION

Fig. 19
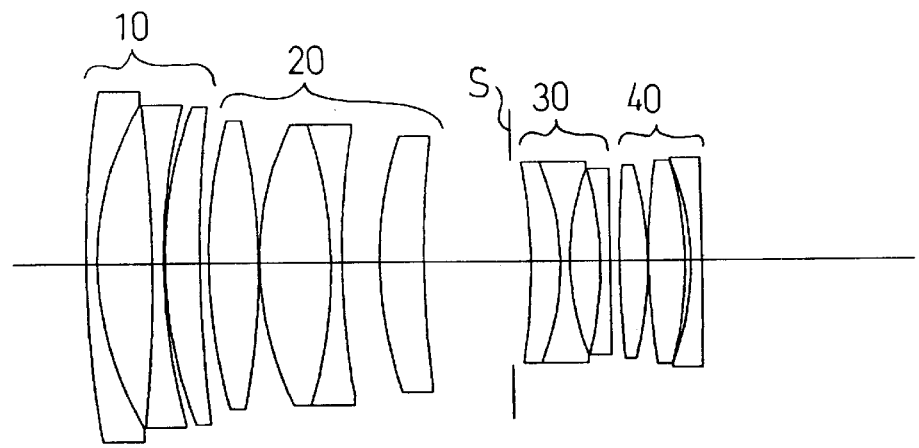
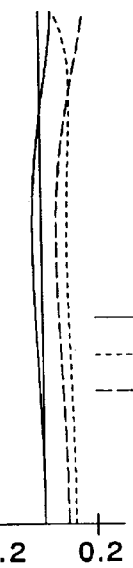
Fig.20A
F_{NO}=2.4
SPHERICAL
ABERRATION
CHROMATIC
ABERRATION
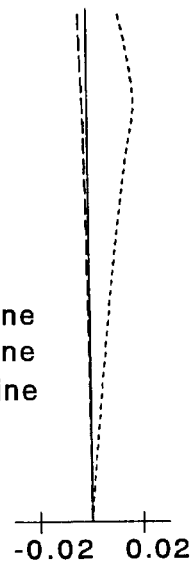
Fig.20B
W=14.2°
— d Line
---- g Line
----- C Line
LATERAL
CHROMATIC
ABERRATION
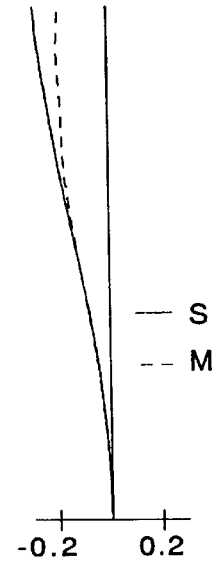
Fig.20C
W=14.2°
— S
-- M
ASTIGMATISM
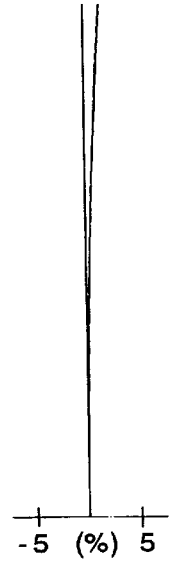
Fig.20D
W=14.2°
DISTORTION

F_NO=2.4

——— d Line
------- g Line
---- C Line

-0.2  0.2

SPHERICAL
ABERRATION

CHROMATIC
ABERRATION

W=26.7°

-0.02  0.02

LATERAL
CHROMATIC
ABERRATION

W=26.7°

— S
-- M

-0.2  0.2

ASTIGMATISM

W=26.7°

-5 (%) 5

DISTORTION

Fig. 23
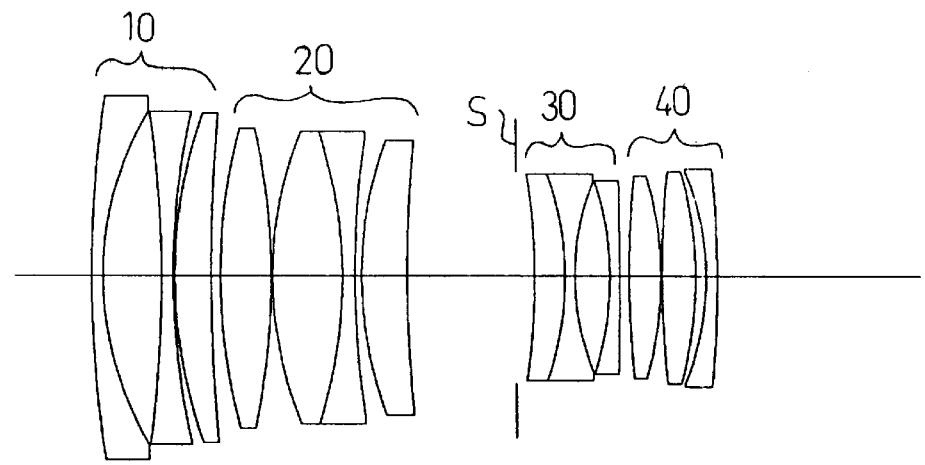
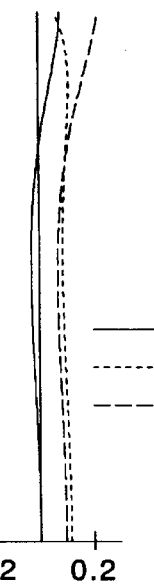
Fig.24A
$F_{NO}=2.4$
—— d Line
------- g Line
----- C Line
-0.2    0.2
SPHERICAL
ABERRATION
CHROMATIC
ABERRATION
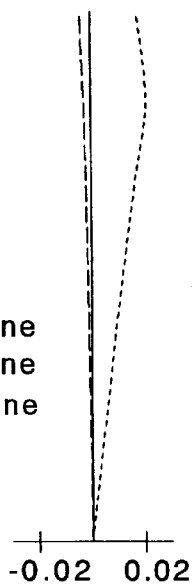
Fig.24B
W=14.3°
-0.02    0.02
LATERAL
CHROMATIC
ABERRATION
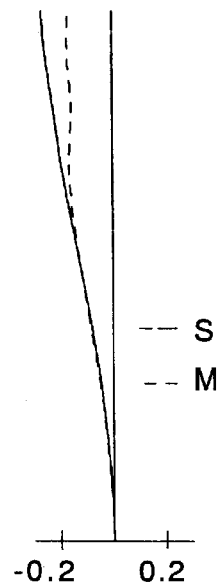
Fig.24C
W=14.3°
— — S
- - M
-0.2    0.2
ASTIGMATISM
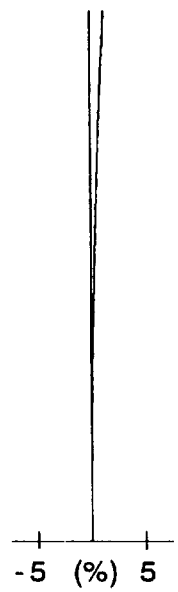
Fig.24D
W=14.3°
-5  (%)  5
DISTORTION

ZOOM LENS SYSTEM

BACKGROUND OF THE INVENTION

1. Field of the Invention

The present invention relates to a zoom lens system in which the angle-of-view at the short focal length extremity is about 52°, and the angle-of-view at the long focal length extremity is about 28°.

2. Description of the Related Art

As a conventional zoom lens system, for a 35 mm camera, covering a semi-standard wide-angle range over an intermediate telephoto range, a zoom lens system in which the F-number is 4 and the focal length range is about 28 mm to 80 mm is already known; however, a focal length on the telephoto side is short and the F-number is larger. Further, a zoom lens system in which the F-number is 2.8 which is slightly smaller than 4, and the focal length range is about 28 mm to 70 mm is also known; however, a focal length on the telephoto side is much shorter.

SUMMARY OF THE INVENTION

It is an object of the present invention to provide a miniaturized and high-optical-performance zoom lens system which has a large aperture, and in which the focal length at the long focal length extremity is made long though the focal length at the short focal length extremity cannot be made short. More concretely, it is an object of the present invention to provide a high-optical performance zoom lens system in which the F-number is about 2.8, and the focal length range about 45 mm to 90 mm.

A zoom lens system according to the present invention includes a negative first lens group, a positive second lens group, a negative third lens group and a positive fourth lens group, in this order from the object. The zoom lens system satisfies the following conditions:

$$4 < fL/D1 < 6 \quad (1)$$

$$1.0 < |fL/f1| < 1.3 \quad (2)$$

wherein fL designates the focal length of the entire zoom lens system at the long focal length extremity;

D1 designates the distance, along the optical axis, from the most object-side to the most image-side lens surfaces of the first lens group; and f1 designates the focal length of the first lens group.

The second lens group preferably satisfies the following condition:

$$1.5 < fL/f2 < 2.5 \quad (3)$$

wherein f2 designates the focal length of the second lens group.

The second lens group through the fourth lens group preferably satisfy the following conditions:

$$1.0 < |f2/f3| < 1.5 \quad (4)$$

$$1.7 < fL/f4 < 2.5 \quad (5)$$

wherein f3 designates the focal length of the third lens group; and f4 designates the focal length of the fourth lens group.

The present disclosure relates to subject matter contained in Japanese Patent Application No.Hei 11-39988 (filed on Feb. 18, 1999) which is expressly incorporated herein by reference in its entirety.

BRIEF DESCRIPTION OF THE DRAWINGS

The invention will be discussed below in detail with reference to the accompanying drawings, in which:

FIG. 1 is a lens arrangement, at the short focal length extremity, of a first embodiment of a zoom lens system according to the present invention;

FIG. 7 is the lens arrangement, at the long focal length extremity, of the second embodiment of the zoom lens system;

FIGS. 8A, 8B, 8C and 8D are aberration diagrams of the zoom lens system of FIG. 7;

FIG. 17 is a lens arrangement, at the short focal length extremity, of a fifth embodiment of a zoom lens system according to the present invention;

FIG. 19 is the lens arrangement, at the long focal length extremity, of the fifth embodiment of the zoom lens system;

FIGS. 20A, 20B, 20C and 20D are aberration diagrams of the zoom lens system of FIG. 19;

FIG. 23 is the lens arrangement, at the long focal length extremity, of the sixth embodiment of the zoom lens system;

FIGS. 24A, 24B, 24C and 24D are aberration diagrams of the zoom lens system of FIG. 23;

DESCRIPTION OF THE PREFERRED EMBODIMENTS

Figure 25:
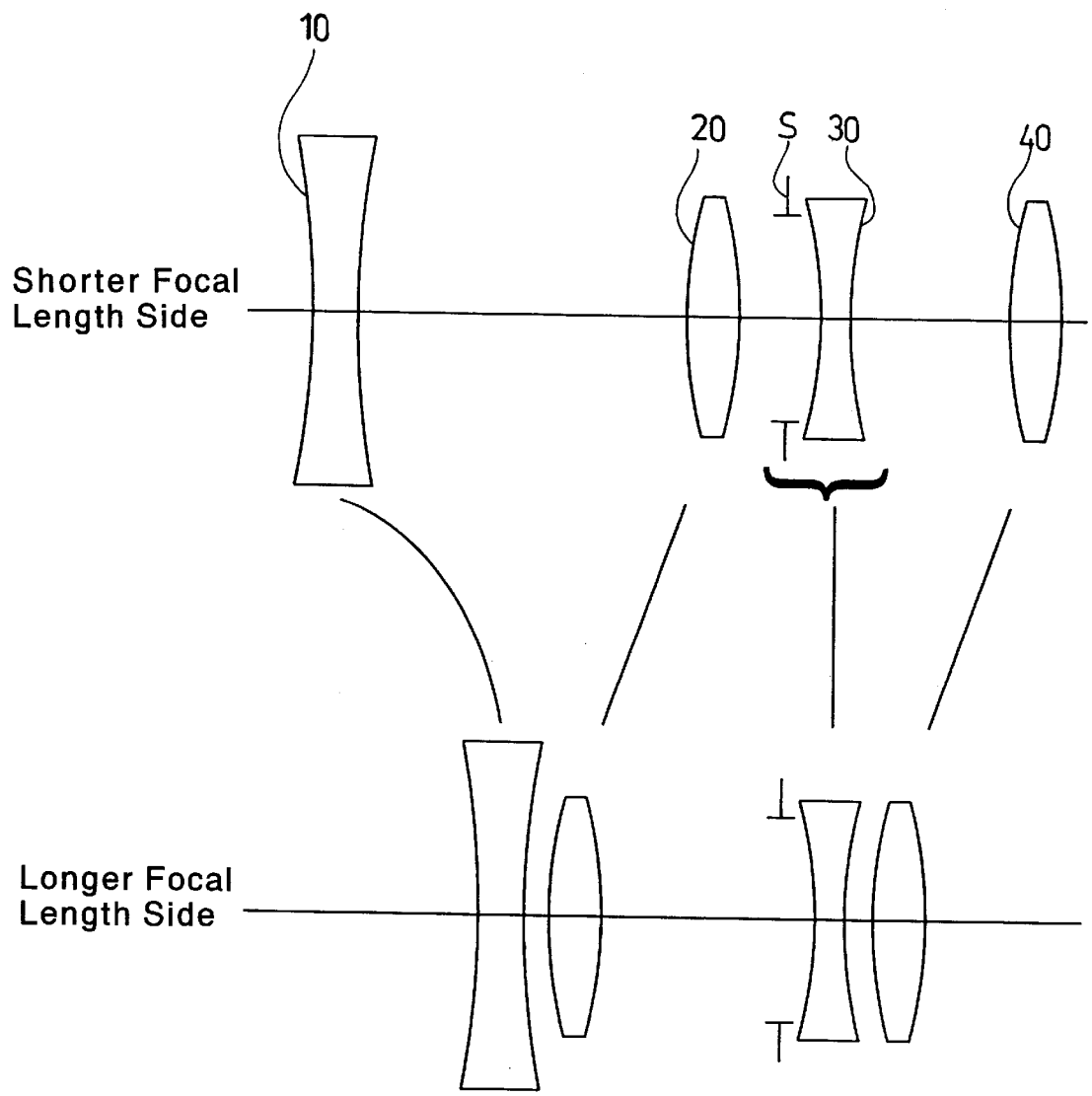
FIG. 25 is the lens-group moving paths of the zoom lens system according to the first through fourth embodiments.
Figure 26:
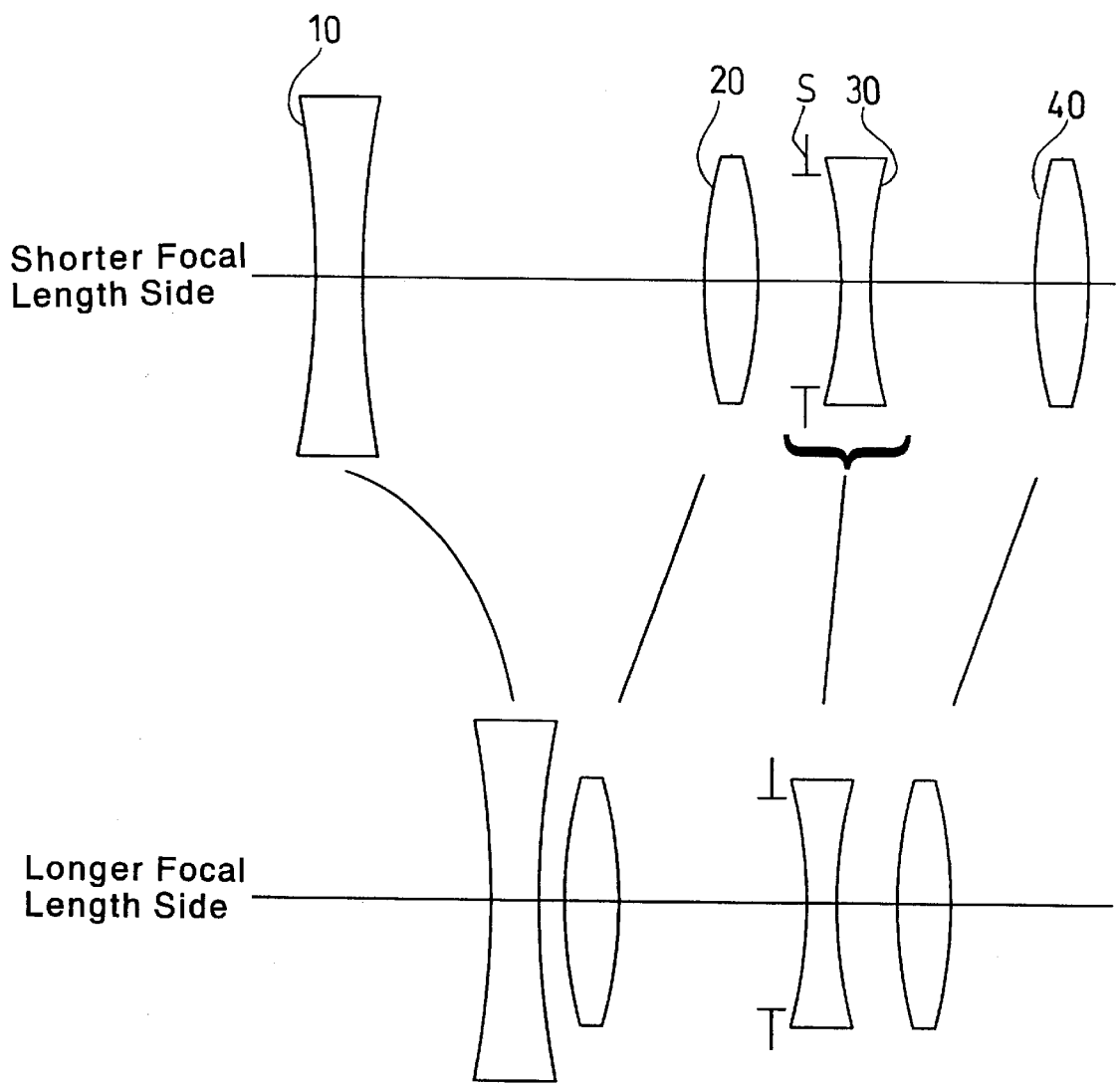
FIG. 26 is the lens-group moving paths of the zoom lens system according to the fifth and sixth embodiments.

As shown in the lens-group moving paths of FIGS. 25 and 26, the zoom lens system of the present invention includes a negative first lens group 10, a positive second lens group 20, a negative third lens group 30, and a positive fourth lens group 40, in this order from the object. Focusing is performed by moving the first lens group 10 along the optical axis.

A basic conception on the four-lens-group zoom lens system according to the present invention is as follows:

(i) in order to make the overall length of the lens system short, the length, along the optical axis, of the first lens group 10 is made short, i.e., the thickness thereof is reduced, and the power of the first lens group 10 is weakened;

(ii) in order to make the diaphragm diameter small while the F-number is maintained small, the second lens group 20 is provided with strong power; and (iii) in order to prevent the back focal distance from being too long, the power of the second lens group 20 is made weaker than that of the third lens group 30, and thereby a divergent bundle of rays emitted from the third lens group 30 is converged by the fourth lens group 40 having strong positive power.

Condition (1) specifies the overall length (thickness), along the optical axis, of the first lens group 10.

If the overall length of the first lens group 10 becomes short to the extent that fL/D1 exceeds the upper limit of condition (1), the traveling distance, from a telephoto side toward a wide-angle side, of the first lens group 10 increases, since the power of the first lens group 10 is determined by condition (2). This results in an increase of the diameter of the front lens element (i.e., the most object-side lens element in the lens system) in order to maintain peripheral illumination at the short focal length extremity, which is not preferable for the lens system.

If the overall length of the first lens group 10 becomes long to the extent that fL/D1 exceeds the lower limit of condition (1), the overall length of the lens system at the long focal extremity becomes long.

Condition (2) specifies the power of the first lens group 10.

If the power of the first lens group 10 is made strong to the extent that |fL/f1| exceeds the upper limit of condition (2), fluctuations of aberrations upon zooming becomes large. As a result, it is difficult to correct aberrations over the entire zooming range.

If the power of the first lens group 10 is made weak to the extent that |fL/f1| exceeds the lower limit of condition (2), the traveling distance of the first lens group 10 upon zooming becomes long. As a result, the size of the lens system is made large.

Condition (3) specifies the power of the second lens group 20.

If the power of the second lens group 20 is made strong to the extent that fL/f2 exceeds the upper limit of condition (3), it becomes difficult to correct coma, astigmatism and the like.

If the power of the second lens group 20 is made weak to the extent that fL/f2 exceeds the lower limit of condition (3), the traveling distance of the second lens group 20 becomes long. As a result, the overall length of the lens system at the long focal length extremity is made long. Furthermore, at the long focal length extremity, the diaphragm diameter and the diameter of lens elements have to be made large, so that it becomes difficult to constitute a diaphragm mechanism. Still further, the diameter of a lens barrel becomes large.

Condition (4) specifies the ratio of the power of the second to third lens groups.

If |f2/f3| exceeds the upper limit of condition (4), the negative power of the third lens group 30 becomes stronger than the positive power of the second lens group 20, and thereby fluctuations of coma upon zooming becomes large.

If |f2/f3| exceeds the lower limit of condition (4), the negative power of the third lens group 30 becomes weaker than the positive power of the second lens group 20, and thereby the effect of diverging a bundle of rays at the third lens group 30 becomes small. As a result, it is difficult to maintain the back focal distance at the short focal length extremity.

Condition (5) is to arrange the positive fourth lens group 40 to converge an divergent bundle of rays emitted from the third lens group 30, and thereby an unnecessary increase of the back focal distance is prevented.

If the positive power of the fourth lens group becomes weak to the extent that fL/f4 exceeds the lower limit of condition (5), the back focal distance becomes too long.

If the positive power of the fourth lens group becomes strong to the extent that fL/f4 exceeds the upper limit of condition (5), fluctuations of aberrations upon zooming become large. As a result, it is difficult to correct aberrations over the entire zooming range.

Specific numerical data of the embodiments will be described hereinafter. In the diagrams of chromatic aberration (axial chromatic aberration) represented by spherical aberration, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines; S designates the sagittal image; M designates the meridional image. In the tables, FNO designates the F-number, f designates the focal length of the entire lens system, W designates the half angle-of-view (°), fB designates the back focal distance, r designates the radius of curvature, d designates the lens thickness or space between lens surfaces, Nd designates the refractive index with respect to the d-line, and v designates the Abbe number.

Embodiment 1

Figure 2A:
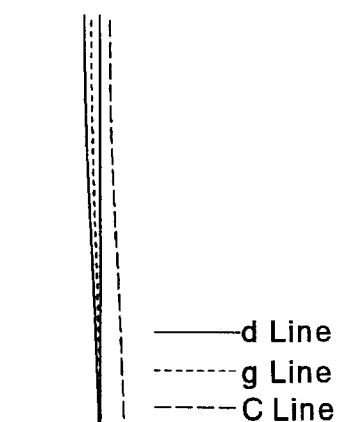
FIGS. 2A, 2B, 2C and 2D are aberration diagrams of the zoom lens system of FIG. 1.
Figure 2B:
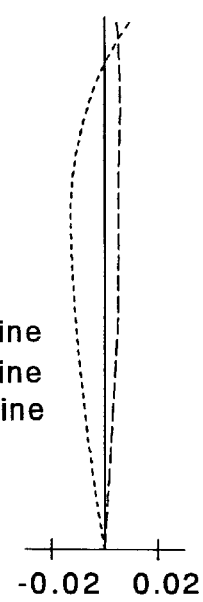
Figure 2C:
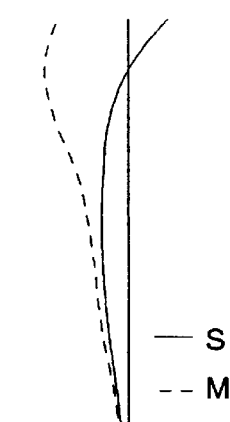
Figure 2D:
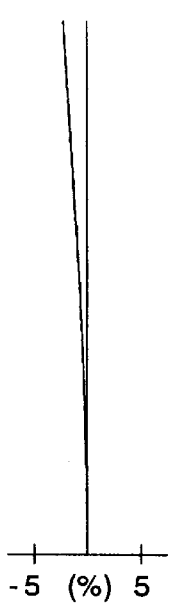
Figure 3:
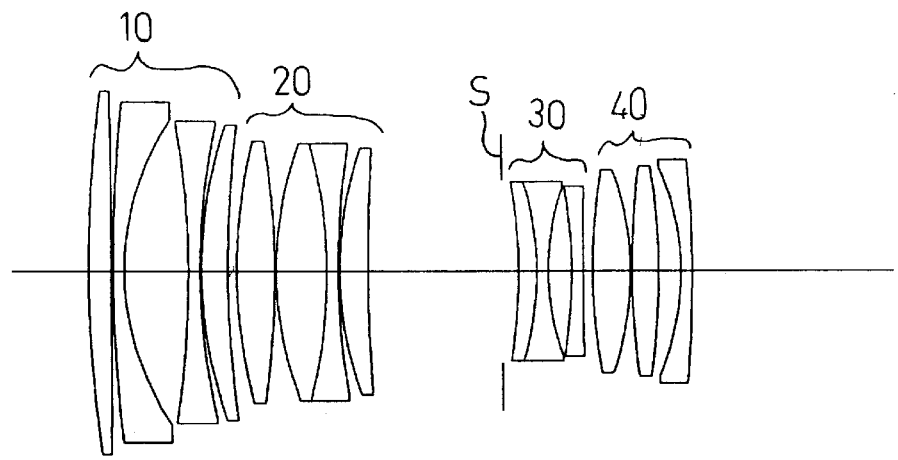
FIG. 3 is the lens arrangement, at the long focal length extremity, of the first embodiment of the zoom lens system.
Figure 4A:
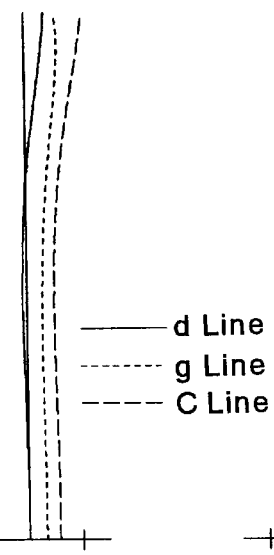
FIGS. 4A, 4B, 4C and 4D are aberration diagrams of the zoom lens system of FIG. 3.
Figure 4B:
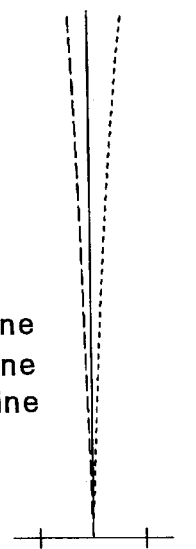
Figure 4C:
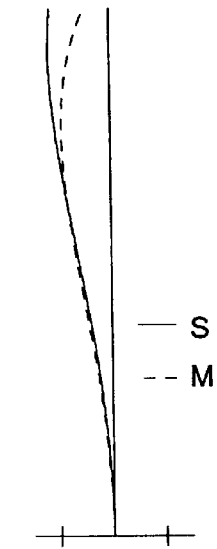
Figure 4D:
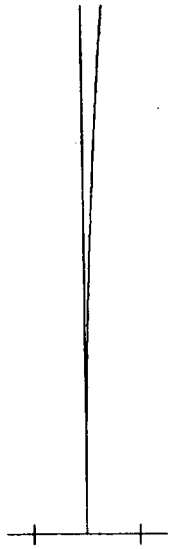

FIGS. 1 and 3 are the lens arrangements of the first embodiment respectively at the short focal length extremity and the long focal length extremity. FIGS. 2A, 2B, 2C and 2D are aberration diagrams of the zoom lens system of FIG. 1; and FIGS. 4A, 4B, 4C and 4D are aberration diagrams of the zoom lens system of FIG. 3. Table 1 shows the numerical data thereof. The first lens group 10 includes a positive lens element, a negative lens element, a negative lens element, and a positive lens element, in this order from the object. The second lens group 20 includes a positive lens element, a cemented sub lens group having a positive lens element and a negative lens element, and a positive lens element, in this order from the object. The third lens group 30 includes a cemented sub lens group having a positive lens element and a negative lens element, and a negative lens element, in this order from the object. The fourth lens group 40 includes a positive lens element, a positive lens element, and a negative lens element, in this order from the object. In this first embodiment, upon zooming, each lens group moves as shown in FIG. 25: the first lens group moves toward the image, the second and fourth lens groups move toward the object. The diaphragm S is fixed between the second and third lens groups, and is not moved. The third lens group as well remains stationary.

TABLE 1

$F_{NO} = 1:2.8–2.8$
$f = 45.30–73.00–88.00$
$W = 26.0°–16.4°–13.6°$
$f_B = 42.31–49.67–53.26$

| Surface No. | r | d | Nd | ν |
|---|---|---|---|---|
| 1 | 174.921 | 2.977 | 1.68893 | 31.1 |
| 2 | −2900.666 | 0.200 | — | — |
| 3 | 194.588 | 1.500 | 1.60311 | 60.7 |
| 4 | 36.543 | 8.407 | — | — |
| 5 | −125.530 | 1.500 | 1.60311 | 60.7 |
| 6 | 87.284 | 0.200 | — | — |
| 7 | 60.660 | 3.436 | 1.80518 | 25.4 |
| 8 | 143.093 | 37.153–8.415–1.200 | — | — |
| 9 | 69.915 | 4.970 | 1.69680 | 55.5 |
| 10 | −121.830 | 0.200 | — | — |
| 11 | 48.508 | 6.715 | 1.48749 | 70.2 |
| 12 | −66.356 | 1.500 | 1.84666 | 23.9 |
| 13 | 100.678 | 0.200 | — | — |
| 14 | 49.433 | 3.752 | 1.77250 | 49.6 |
| 15 | 241.022 | 6.753–14.109–17.703 | — | — |
| Diaphragm | ∞ | 2.173 | — | — |
| 16 | −73.514 | 2.473 | 1.80518 | 25.4 |
| 17 | −40.426 | 1.500 | 1.48749 | 70.2 |
| 18 | 33.100 | 3.125 | — | — |
| 19 | −64.396 | 1.500 | 1.48749 | 70.2 |
| 20 | 556.546 | 12.250–4.894–1.300 | — | — |
| 21 | 79.309 | 5.004 | 1.61800 | 63.4 |
| 22 | −40.670 | 0.200 | — | — |
| 23 | 103.712 | 3.554 | 1.61800 | 63.4 |
| 24 | −92.239 | 2.946 | — | — |
| 25 | −35.287 | 1.500 | 1.66446 | 35.8 |
| 26 | −154.669 | — | — | — |

Embodiment 2

Figure 5:
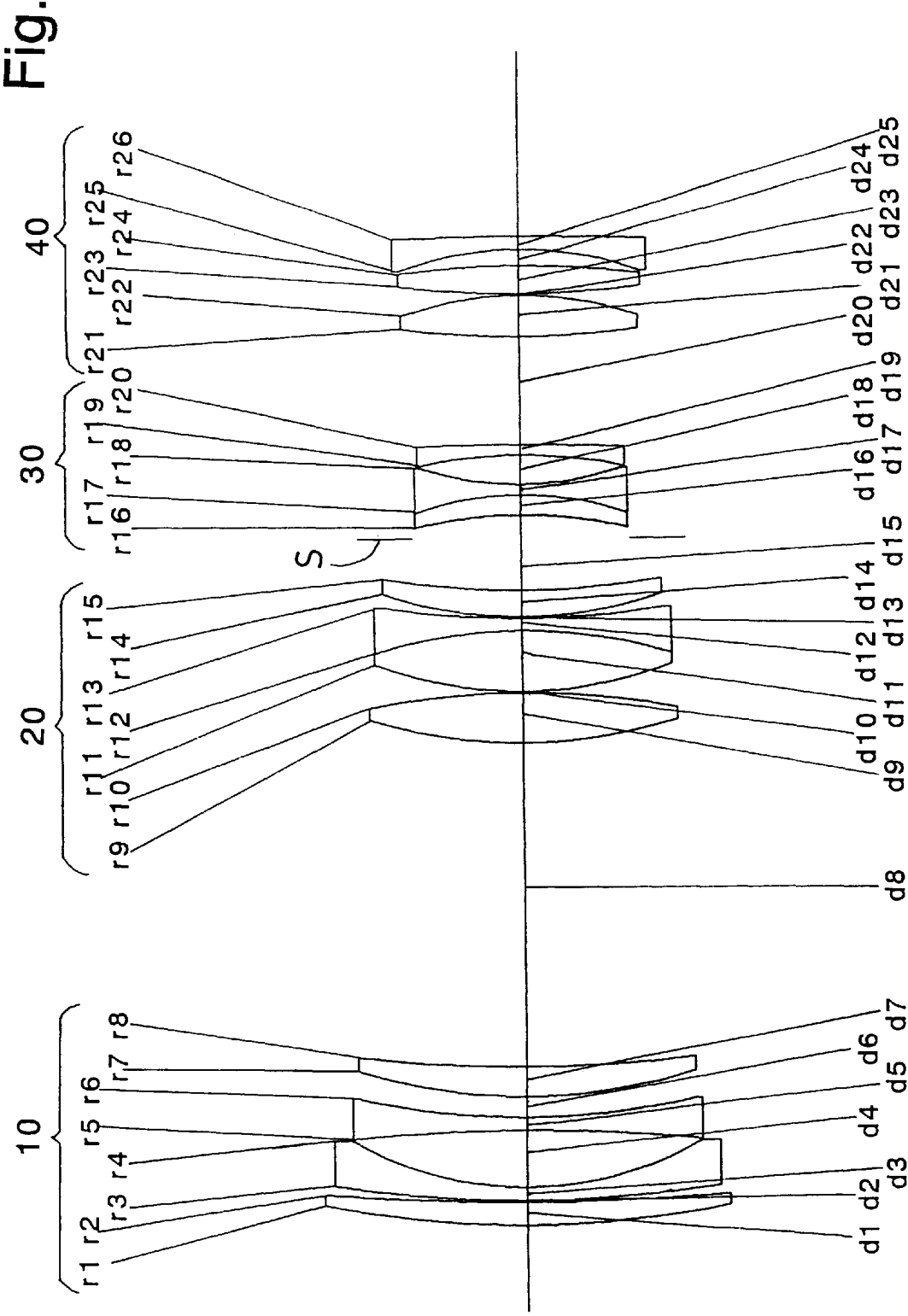
FIG. 5 is a lens arrangement, at the short focal length extremity, of a second embodiment of a zoom lens system according to the present invention.
Figure 6A:
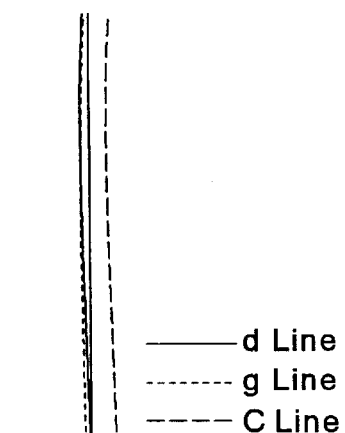
FIGS. 6A, 6B, 6C and 6D are aberration diagrams of the zoom lens system of FIG. 5.
Figure 6B:
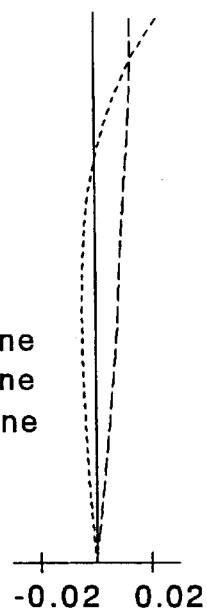
Figure 6C:
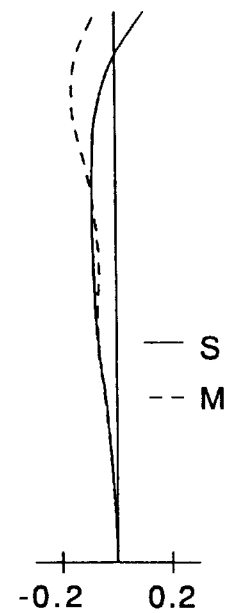
Figure 6D:
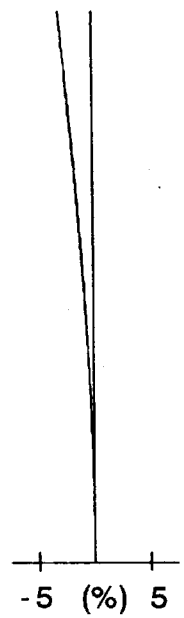

FIGS. 5 and 7 are the lens arrangements of the second embodiment respectively at the short focal length extremity and the long focal length extremity. FIGS. 6A, 6B, 6C and 6D are aberration diagrams of the zoom lens system of FIG. 5; and FIGS. 8A, 8B, 8C and 8D are aberration diagrams of the zoom lens system of FIG. 7. Table 2 shows the numerical data thereof. The basic lens arrangement and the way of moving the lens groups upon zooming are the same as those of the first embodiment.

TABLE 2

$F_{NO} = 1:2.8–2.8–2.8$
$f = 46.00–63.00–88.00$
$W = 25.9°–19.1°–13.6°$
$f_B = 48.28–53.21–59.78$

| Surface No. | r | d | Nd | ν |
|---|---|---|---|---|
| 1 | 121.525 | 2.686 | 1.80518 | 25.4 |
| 2 | 317.244 | 0.200 | — | — |
| 3 | 149.271 | 1.500 | 1.77250 | 49.6 |
| 4 | 41.430 | 6.599 | — | — |
| 5 | −214.073 | 1.500 | 1.72916 | 54.7 |
| 6 | 92.034 | 2.373 | — | — |
| 7 | 65.224 | 3.479 | 1.84666 | 23.8 |
| 8 | 175.089 | 37.696–15.996–1.200 | — | — |
| 9 | 61.743 | 5.814 | 1.61800 | 63.4 |
| 10 | −97.818 | 0.200 | — | — |
| 11 | 48.846 | 7.087 | 1.48749 | 70.2 |
| 12 | −58.920 | 1.500 | 1.80518 | 25.4 |
| 13 | 103.986 | 0.200 | — | — |
| 14 | 50.599 | 3.109 | 1.77250 | 49.6 |
| 15 | 98.239 | 6.179–11.109–17.675 | — | — |
| Diaphragm | ∞ | 2.670 | — | — |
| 16 | −58.563 | 2.393 | 1.80518 | 25.4 |
| 17 | −37.393 | 1.300 | 1.48749 | 70.2 |
| 18 | 38.721 | 3.307 | — | — |
| 19 | −59.640 | 1.300 | 1.48749 | 70.2 |
| 20 | −323.502 | 12.796–7.866–1.300 | — | — |
| 21 | 108.753 | 4.830 | 1.77250 | 49.6 |
| 22 | −41.802 | 0.200 | — | — |
| 23 | 116.426 | 3.355 | 1.69680 | 55.5 |
| 24 | −104.348 | 1.945 | — | — |
| 25 | −40.245 | 1.500 | 1.72825 | 28.5 |
| 26 | −453.700 | — | — | — |

Embodiment 3

Figure 9:
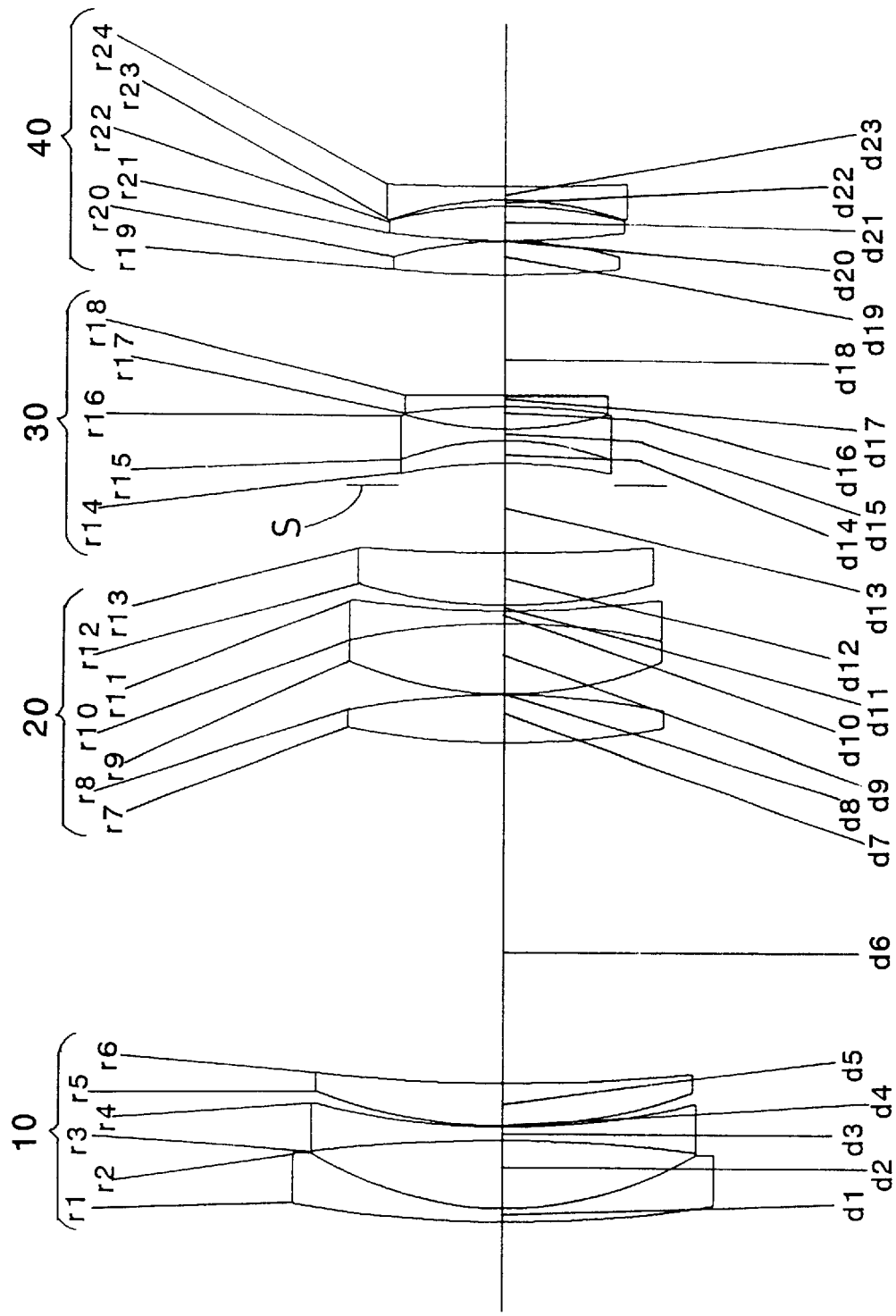
FIG. 9 is a lens arrangement, at the short focal length extremity, of a third embodiment of a zoom lens system according to the present invention.
Figure 10A:
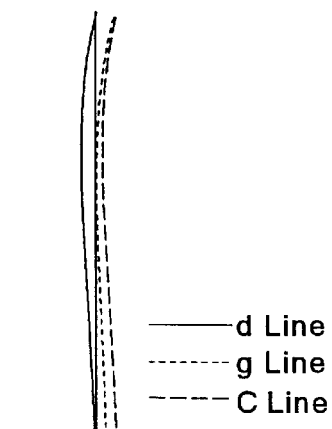
FIGS. 10A, 10B, 10C and 10D are aberration diagrams of the zoom lens system of FIG. 9.
Figure 10B:
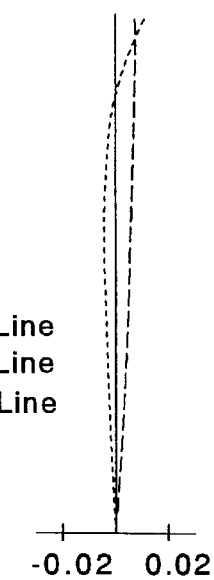
Figure 10C:
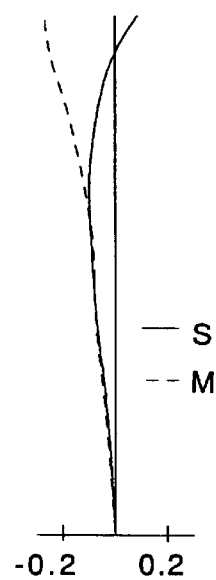
Figure 10D:
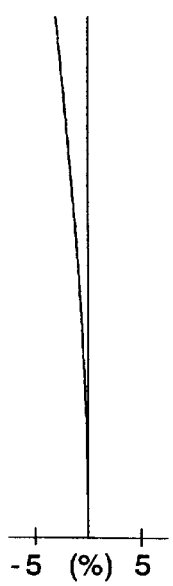
Figure 11:
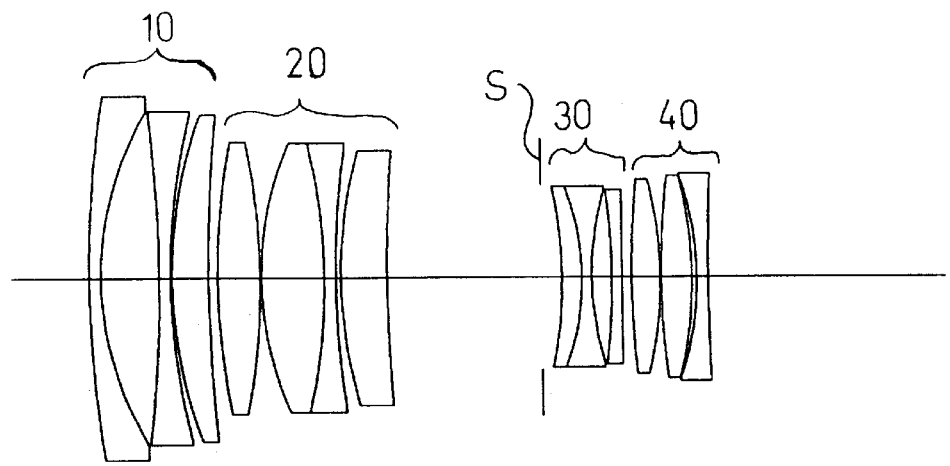
FIG. 11 is the lens arrangement, at the long focal length extremity, of the third embodiment of the zoom lens system.
Figure 12A:
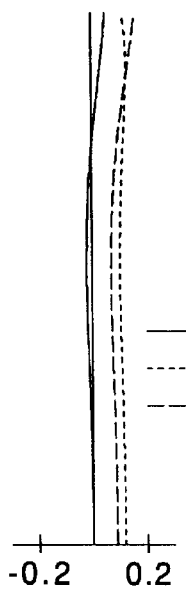
FIGS. 12A, 12B, 12C and 12D are aberration diagrams of the zoom lens system of FIG. 11.
Figure 12B:
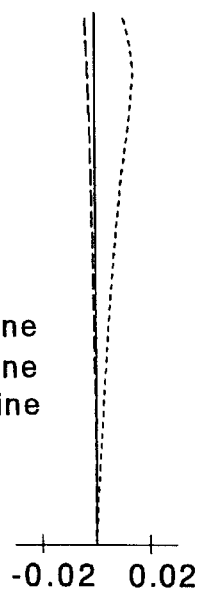
Figure 12C:
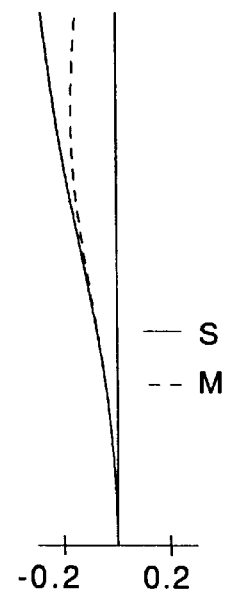
Figure 12D:
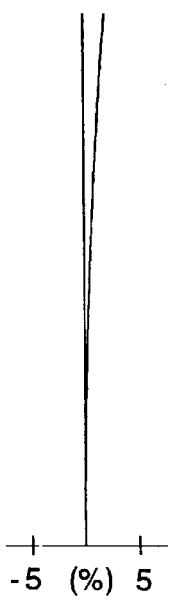

FIGS. 9 and 11 are the lens arrangements of the third embodiment respectively at the short focal length extremity and the long focal length extremity. FIGS. 10A, 10B, 10C and 10D are aberration diagrams of the zoom lens system of FIG. 9; and FIGS. 12A, 12B, 12C and 12D are aberration diagrams of the zoom lens system of FIG. 11. Table 3 shows the numerical data thereof. The first lens group 10 includes a negative lens element, a negative lens element, and a positive lens element, in this order from the object. The second lens group 20 includes a positive lens element, a cemented sub lens group having a positive lens element and a negative lens element, and a positive lens element, in this order from the object. The third lens group 30 includes a cemented sub lens group having a positive lens element and a negative lens element, and a negative lens element, in this order from the object. The fourth lens group 40 includes a positive lens element, a positive lens element, and a negative lens element, in this order from the object. The way of moving the lens groups upon zooming are the same as the first embodiment.

TABLE 3

$F_{NO} = 1:2.8–2.8–2.8$
$f = 46.00–63.00–88.00$
$W = 25.9°–19.0°–13.6°$
$f_B = 45.86–51.16–58.27$

| Surface No. | r | d | Nd | ν |
|---|---|---|---|---|
| 1 | 153.590 | 1.500 | 1.69680 | 55.5 |
| 2 | 42.838 | 7.552 | — | — |
| 3 | −185.636 | 1.500 | 1.61800 | 63.4 |
| 4 | 87.994 | 0.200 | — | — |
| 5 | 62.927 | 4.716 | 1.80518 | 25.4 |
| 6 | 208.882 | 38.616–16.481–1.200 | — | — |
| 7 | 92.567 | 5.512 | 1.61800 | 63.4 |
| 8 | −92.567 | 0.150 | — | — |
| 9 | 44.324 | 8.132 | 1.48749 | 70.2 |
| 10 | −78.953 | 1.500 | 1.80518 | 25.4 |
| 11 | 116.163 | 0.686 | — | — |
| 12 | 61.655 | 6.000 | 1.72916 | 54.7 |
| 13 | 215.213 | 7.765–13.068–20.181 | — | — |
| Diaphragm | ∞ | 2.652 | — | — |
| 14 | −57.402 | 2.614 | 1.80518 | 25.4 |
| 15 | −33.824 | 1.300 | 1.48749 | 70.2 |
| 16 | 40.039 | 2.632 | — | — |

TABLE 3-continued $F_{NO} = 1:2.8-2.8-2.8$
f = 46.00–63.00–88.00
W = 25.9°–19.0°–13.6°
$f_B$ = 45.86–51.16–58.27

| Surface No. | r | d | Nd | ν |
|---|---|---|---|---|
| 17 | −84.149 | 1.300 | 1.48749 | 70.2 |
| 18 | 33145.058 | 13.715–8.413–1.300 | — | — |
| 19 | 121.594 | 3.759 | 1.72916 | 54.7 |
| 20 | −52.243 | 0.150 | — | — |
| 21 | 108.045 | 4.010 | 1.72916 | 54.7 |
| 22 | −53.937 | 0.683 | — | — |
| 23 | −40.618 | 1.500 | 1.72151 | 29.2 |
| 24 | 335.026 | — | — | — |

Embodiment 4

Figure 13:
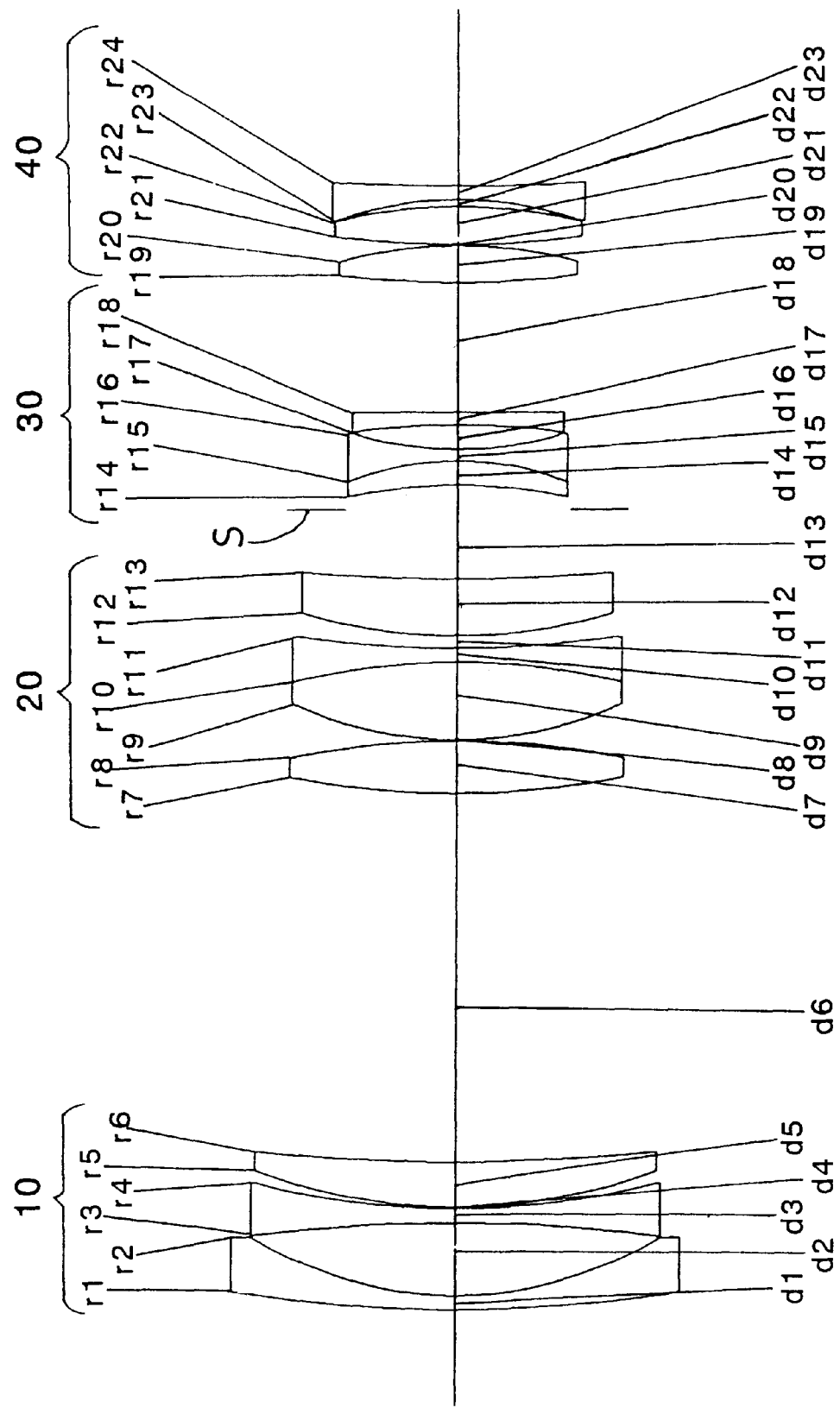
FIG. 13 is a lens arrangement, at the short focal length extremity, of a fourth embodiment of a zoom lens system according to the present invention.
Figure 14A:
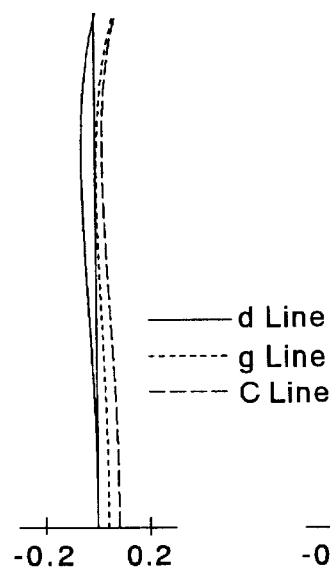
FIGS. 14A, 14B, 14C and 14D are aberration diagrams of the zoom lens system of FIG. 13.
Figure 14B:
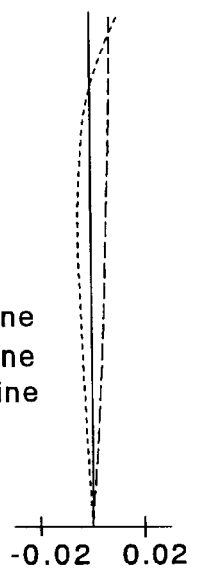
Figure 14C:
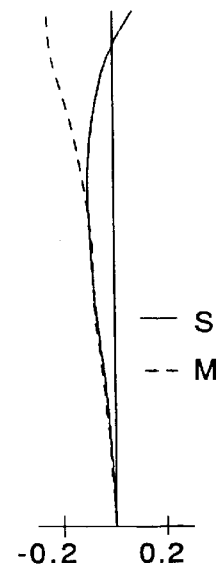
Figure 14D:
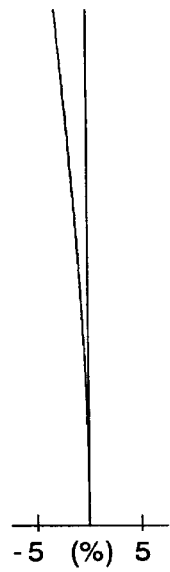
Figure 15:
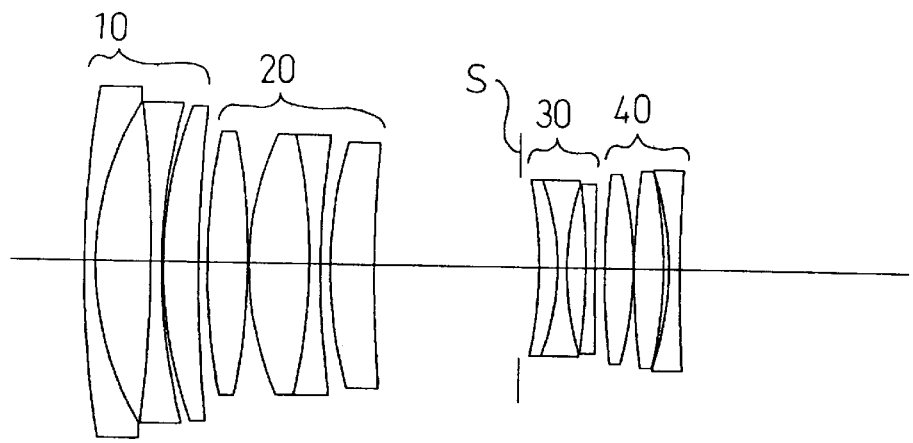
FIG. 15 is the lens arrangement, at the long focal length extremity, of the fourth embodiment of the zoom lens system.
Figure 16A:
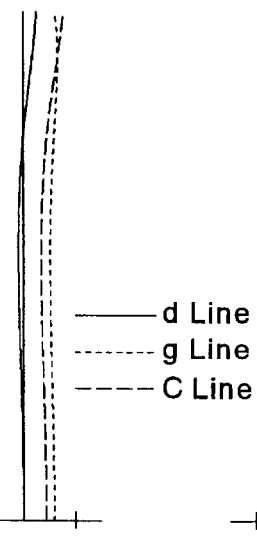
FIGS. 16A, 16B, 16C and 16D are aberration diagrams of the zoom lens system of FIG. 15.
Figure 16B:
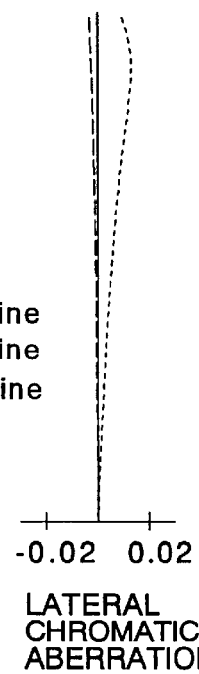
Figure 16C:
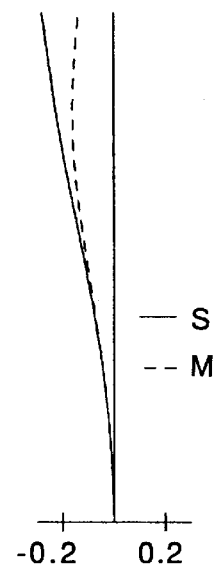
Figure 16D:
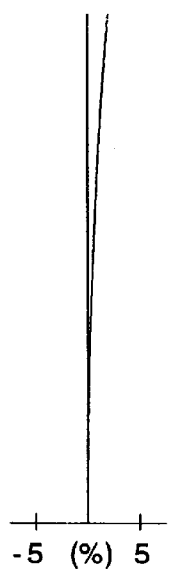
Figure 18A:
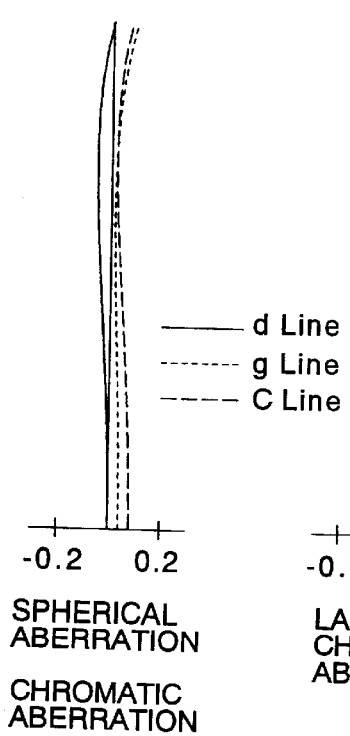
FIGS. 18A, 18B, 18C and 18D are aberration diagrams of the zoom lens system of FIG. 17.
Figure 18B:
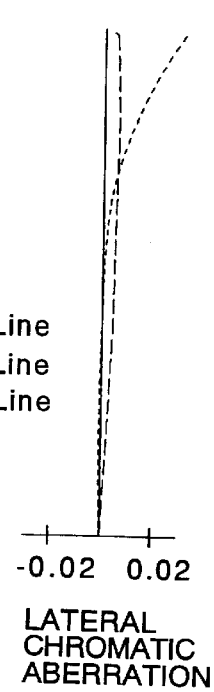
Figure 18C:
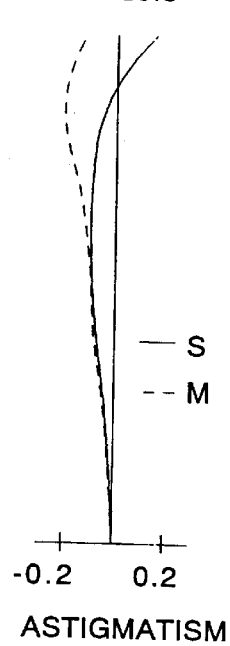
Figure 18D:
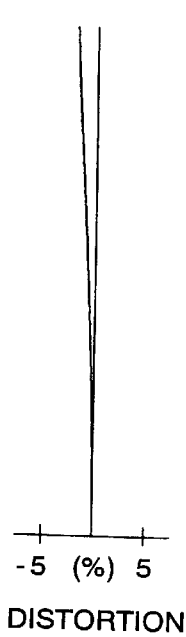

FIGS. 13 and 15 are the lens arrangements of the fourth embodiment respectively at the short focal length extremity and the long focal length extremity. FIGS. 14A, 14B, 14C and 14D are aberration diagrams of the zoom lens system of FIG. 13; and FIGS. 16A, 16B, 16C and 16D are aberration diagrams of the zoom lens system of FIG. 15. Table 4 shows the numerical data thereof. The basic lens arrangement and the way of moving the lens groups upon zooming are the same as those of the third embodiment.

TABLE 4

$F_{NO} = 1:2.8-2.8-2.8$
f = 46.00–63.00–88.00
W = 25.9°–19.0°–13.6°
$f_B$ = 45.41–50.75–57.93

| Surface No. | r | d | Nd | ν |
|---|---|---|---|---|
| 1 | 149.635 | 1.500 | 1.69680 | 55.5 |
| 2 | 42.832 | 7.527 | — | — |
| 3 | −187.781 | 1.500 | 1.61800 | 63.4 |
| 4 | 86.150 | 0.200 | — | — |
| 5 | 62.452 | 4.720 | 1.80518 | 25.4 |
| 6 | 204.628 | 38.722–16.525–1.200 | — | — |
| 7 | 92.523 | 5.500 | 1.61800 | 63.4 |
| 8 | −92.523 | 0.150 | — | — |
| 9 | 43.774 | 8.153 | 1.48749 | 70.2 |
| 10 | −79.213 | 1.500 | 1.80518 | 25.4 |
| 11 | 114.512 | 1.380 | — | — |
| 12 | 61.155 | 6.000 | 1.72916 | 54.7 |
| 13 | 199.458 | 7.343–12.688–19.863 | — | — |
| Diaphragm | ∞ | 2.656 | — | — |
| 14 | −57.453 | 2.500 | 1.80518 | 25.4 |
| 15 | −33.938 | 1.300 | 1.48749 | 70.2 |
| 16 | 40.594 | 2.560 | — | — |
| 17 | −91.679 | 1.300 | 1.48749 | 70.2 |
| 18 | 1925.707 | 13.820–8.475–1.300 | — | — |
| 19 | 112.455 | 3.865 | 1.72916 | 54.7 |
| 20 | −51.275 | 0.150 | — | — |
| 21 | 101.415 | 4.029 | 1.72916 | 54.7 |
| 22 | −58.754 | 0.719 | — | — |
| 23 | −41.738 | 1.500 | 1.71736 | 29.5 |
| 24 | 227.819 | — | — | — |

Embodiment 5

FIGS. 17 and 19 are the lens arrangements of the fifth embodiment respectively at the short focal length extremity and the long focal length extremity. FIGS. 18A, 18B, 18C and 18D are aberration diagrams of the zoom lens system of FIG. 17; and FIGS. 20A, 20B, 20C and 20D are aberration diagrams of the zoom lens system of FIG. 19. Table 5 shows the numerical data thereof. The basic lens arrangement is the same as the third embodiment. In this fifth embodiment, upon zooming, each lens group moves as shown in FIG. 26: the first lens group moves toward the image, the second, third and fourth lens groups move toward the object. The diaphragm S is provided between the second and third lens groups, and integrally moves with the third lens group 30.

TABLE 5

$F_{NO} = 1:2.4-2.4-2.4$
f = 44.30–62.95–84.50
W = 26.5°–18.9°–14.2°
$f_B$ = 40.18–47.10–55.69

| Surface No. | r | d | Nd | ν |
|---|---|---|---|---|
| 1 | 152.134 | 1.500 | 1.72916 | 54.7 |
| 2 | 43.956 | 7.368 | — | — |
| 3 | −205.247 | 1.500 | 1.61800 | 63.4 |
| 4 | 87.050 | 0.200 | — | — |
| 5 | 62.085 | 4.716 | 1.80518 | 25.4 |
| 6 | 188.288 | 41.711–15.672–1.200 | — | — |
| 7 | 75.309 | 6.747 | 1.61800 | 63.4 |
| 8 | −93.631 | 0.150 | — | — |
| 9 | 44.055 | 9.669 | 1.48749 | 70.2 |
| 10 | −64.970 | 1.500 | 1.80518 | 25.4 |
| 11 | 111.790 | 5.098 | — | — |
| 12 | 55.165 | 6.000 | 1.80400 | 46.6 |
| 13 | 154.812 | 3.328–7.854–11.860 | — | — |
| Diaphragm | ∞ | 2.586 | — | — |
| 14 | −80.675 | 4.000 | 1.80518 | 25.4 |
| 15 | −35.953 | 1.300 | 1.48749 | 70.2 |
| 16 | 35.953 | 4.111 | — | — |
| 17 | −49.865 | 1.300 | 1.48749 | 70.2 |
| 18 | 1734.924 | 9.832–5.307–1.300 | — | — |
| 19 | 149.026 | 3.802 | 1.72916 | 54.7 |
| 20 | −51.575 | 0.150 | — | — |
| 21 | 95.263 | 4.957 | 1.72916 | 54.7 |
| 22 | −50.939 | 0.797 | — | — |
| 23 | −37.612 | 1.500 | 1.76182 | 26.5 |
| 24 | −1151.998 | — | — | — |

Embodiment 6

Figure 21:
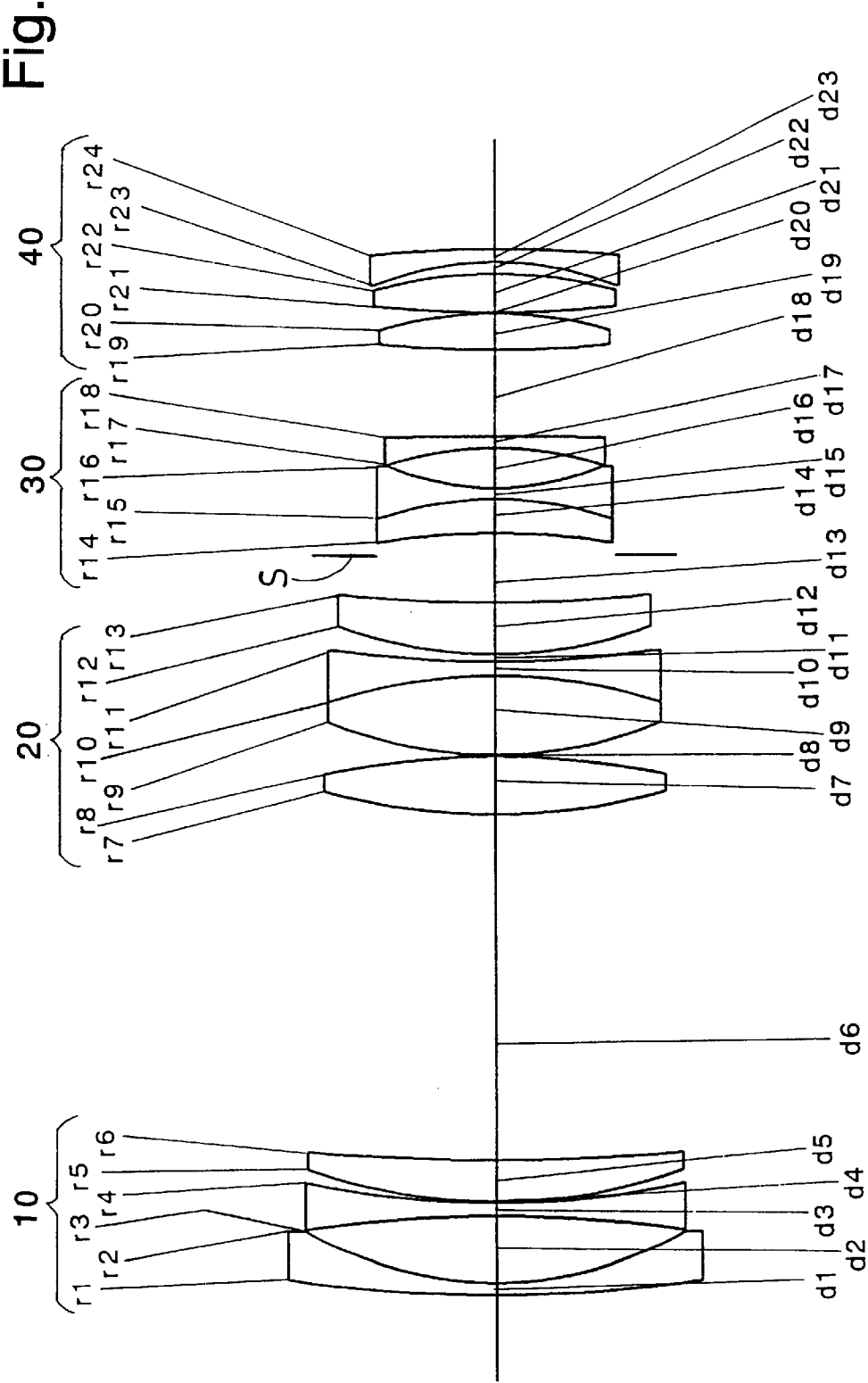
FIG. 21 is a lens arrangement, at the short focal length extremity, of a sixth embodiment of a zoom lens system according to the present invention.
Figure 22A:
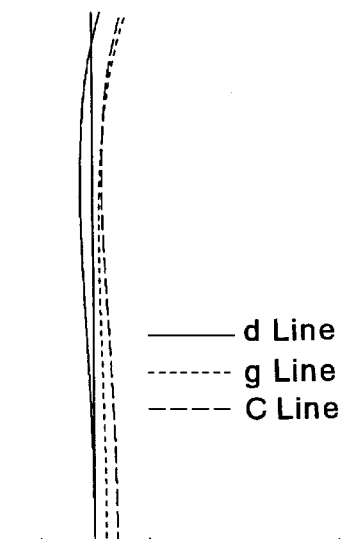
FIGS. 22A, 22B, 22C and 22D are aberration diagrams of the zoom lens system of FIG. 21.
Figure 22B:
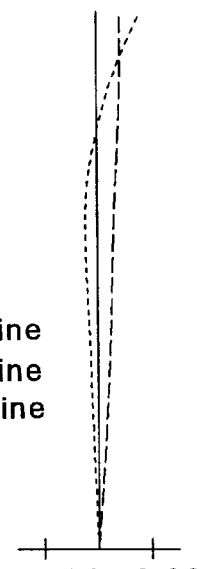
Figure 22C:
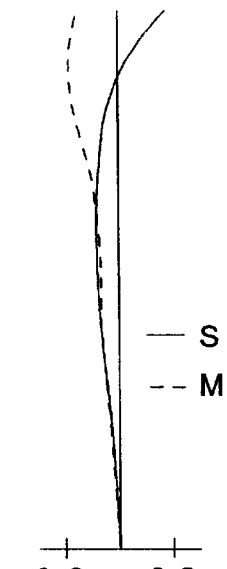
Figure 22D:
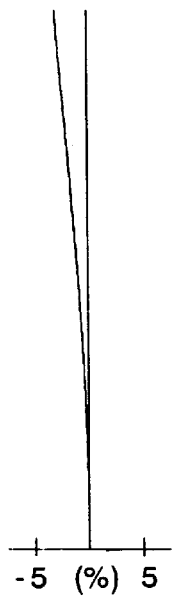

FIGS. 21 and 23 are the lens arrangements of the sixth embodiment respectively at the short focal length extremity and the long focal length extremity. FIGS. 22A, 22B, 22C and 22D are aberration diagrams of the zoom lens system of FIG. 21; and FIGS. 24A, 24B, 24C and 24D are aberration diagrams of the zoom lens system of FIG. 23. Table 6 shows the numerical data thereof. The basic lens arrangement is the same as the third embodiment, and the way of moving the lens groups upon zooming is the same as the fifth embodiment.

TABLE 6

$F_{NO} = 1:2.4-2.4-2.4$
f = 44.30–62.81–84.00
W = 26.7°–19.0°–14.3°
$f_B$ = 42.59–48.61–56.45

| Surface No. | r | d | Nd | ν |
|---|---|---|---|---|
| 1 | 158.797 | 1.500 | 1.72916 | 54.7 |
| 2 | 43.584 | 7.719 | — | — |
| 3 | −163.991 | 1.500 | 1.61800 | 63.4 |
| 4 | 100.064 | 0.200 | — | — |
| 5 | 65.845 | 4.788 | 1.80518 | 25.4 |
| 6 | 249.616 | 40.060–15.127–1.200 | — | — |
| 7 | 76.435 | 6.716 | 1.61800 | 63.4 |
| 8 | −95.545 | 0.150 | — | — |
| 9 | 50.707 | 9.247 | 1.48749 | 70.2 |
| 10 | −63.083 | 1.649 | 1.80518 | 25.4 |
| 11 | 127.349 | 0.873 | — | — |
| 12 | 52.920 | 6.000 | 1.77250 | 49.6 |
| 13 | 176.499 | 5.582–10.326–14.374 | — | — |
| Diaphragm | ∞ | 2.434 | — | — |
| 14 | −91.988 | 4.000 | 1.80518 | 25.4 |
| 15 | −41.856 | 1.300 | 1.48749 | 70.2 |

TABLE 6-continued $F_{NO} = 1:2.4–2.4–2.4$
$f = 44.30–62.81–84.00$
$W = 26.7°–19.0°–14.3°$
$f_B = 42.59–48.61–56.45$

| Surface No. | r | d | Nd | ν |
|---|---|---|---|---|
| 16 | 33.484 | 4.647 | — | — |
| 17 | −41.018 | 1.300 | 1.48749 | 70.2 |
| 18 | −620.888 | 10.093–5.348–1.300 | — | — |
| 19 | 142.111 | 4.196 | 1.72916 | 54.7 |
| 20 | −48.562 | 0.150 | — | — |
| 21 | 133.143 | 4.437 | 1.72916 | 54.7 |
| 22 | −53.566 | 1.374 | — | — |
| 23 | −38.019 | 1.500 | 1.80518 | 25.4 |
| 24 | −157.708 | — | — | — |

Table 7 shows the numerical values of each condition for each embodiment.

TABLE 7

| | Cond.(1) | Cond.(2) | Cond.(3) | Cond.(4) | Cond.(5) |
|---|---|---|---|---|---|
| Embod.1 | 4.83 | 1.18 | 2.12 | 1.12 | 2.00 |
| Embod.2 | 4.80 | 1.06 | 1.87 | 1.18 | 2.05 |
| Embod.3 | 5.69 | 1.16 | 1.93 | 1.05 | 1.86 |
| Embod.4 | 5.70 | 1.16 | 1.92 | 1.04 | 1.84 |
| Embod.5 | 5.53 | 1.12 | 1.92 | 1.13 | 1.88 |
| Embod.6 | 5.35 | 1.10 | 1.92 | 1.22 | 2.00 |

As can be understood from Table 7, each embodiment satisfies each condition; and as can be understood from the aberration diagrams, the various aberrations are adequately corrected.

According to the present invention, a miniaturized and high-optical-performance zoom lens system, which has a large aperture, and at the same time, can make the focal length at the long focal length extremity longer, can be obtained even when the focal length at the short focal length extremity is enough short to be in a standard wide-angle range, and the focal length at the long focal length extremity lies in a telephoto range.

What is claimed is:

1. A zoom lens system comprises a negative first lens group, a positive second lens group, a negative third lens group and a positive fourth lens group, in this order from an object;

at least said first, said second and said fourth lens groups move for zooming;

wherein said zoom lens system satisfies the following conditions:

$4 < fL/D1 < 6$ $1.0 < |fL/f1| < 1.3$ wherein
 fL designates the focal length of the entire zoom lens system at the long focal length extremity;
 D1 designates the distance, along the optical axis, from the most object-side to the most image-side lens surfaces of said first lens group; and
 f1 designates the focal length of said first lens group.

2. The zoom lens system according to claim 1, wherein said zoom lens system satisfies the following condition:

$1.5 < fL/f2 < 2.5$ wherein
 f2 designates the focal length of the second lens group.

3. The zoom lens system according to claim 2, wherein said zoom lens system satisfies the following conditions:

$1.0 < |f2/f3| < 1.5$ $1.7 < fL/f4 < 2.5$ wherein
 f3 designates the focal length of said third lens group; and
 f4 designates the focal length of said fourth lens group.

4. A zoom lens system comprises a negative first lens group, a positive second lens group, a negative third lens group and a positive fourth lens group, in this order from an object;

wherein said zoom lens system satisfies the following conditions:

$4 < fL/D1 < 6$ $1.0 < |fL/f1| < 1.3$ $1.0 < |f2/f3| < 1.5$ $1.7 < fL/f4 < 2.5$ wherein
 fL designates the focal length of the entire zoom lens system at the long focal length extremity;
 D1 designates the distance, along the optical axis, from the most object-side to the most image-side lens surfaces of said first lens group;
 f1 designates the focal length of said first lens group;
 f3 designates the focal length of said third lens group; and
 f4 designates the focal length of said fourth lens group.

* * * * *